United States Patent
Bang et al.

(10) Patent No.: US 11,663,856 B2
(45) Date of Patent: May 30, 2023

(54) METHOD FOR INDICATING EXCHANGE OF A FUEL VAPOR ABSORBER AND A VEHICLE WITH AN INDICATOR THEREFORE

(71) Applicant: BLUE WORLD TECHNOLOGIES HOLDING APS, Aalborg Ost (DK)

(72) Inventors: Mads Bang, Stovring (DK); Anders Risum Korsgaard, Aalborg (DK); Mads Friis Jensen, Aalborg (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 0 days.

(21) Appl. No.: 17/792,908

(22) PCT Filed: Jan. 12, 2021

(86) PCT No.: PCT/DK2021/050009
§ 371 (c)(1),
(2) Date: Jul. 14, 2022

(87) PCT Pub. No.: WO2021/148091
PCT Pub. Date: Jul. 29, 2021

(65) Prior Publication Data
US 2023/0081396 A1 Mar. 16, 2023

(30) Foreign Application Priority Data

Jan. 20, 2020 (DK) .............. PA 2020 00063

(51) Int. Cl.
*G07C 5/00* (2006.01)
*B01D 53/04* (2006.01)
(Continued)

(52) U.S. Cl.
CPC ......... *G07C 5/006* (2013.01); *B01D 53/0407* (2013.01); *B60K 15/03504* (2013.01); *B60Q 9/00* (2013.01); *G01F 23/0007* (2013.01); *G07C 5/10* (2013.01); *H01M 8/0432* (2013.01); *H01M 8/04216* (2013.01); *H01M 8/0662* (2013.01); *B01D 2253/102* (2013.01); *B01D 2253/108* (2013.01); *B01D 2253/202* (2013.01);
(Continued)

(58) Field of Classification Search
None
See application file for complete search history.

(56) References Cited

U.S. PATENT DOCUMENTS 5,749,842 A 5/1998 Cheong et al.
10,107,672 B2 10/2018 Aghili et al.
(Continued)

FOREIGN PATENT DOCUMENTS

CN 202413434 U 9/2012
JP 2003028393 A 1/2003
JP 2018074686 A 5/2018

OTHER PUBLICATIONS

International Search Report for PCT/DK2021/05009, Prepared by the Nordic Patent Institute, dated Apr. 8, 2021, 3 pages.

*Primary Examiner* — Todd Melton
(74) *Attorney, Agent, or Firm* — Brooks Kushman PC; John Nemazi

(57) ABSTRACT

An indicator is provided in a vehicle for indicating necessity of change of a fuel vapor absorber in a venting line of a vehicle tank, especially a methanol tank for fuel cell vehicles.

14 Claims, 1 Drawing Sheet

(51) Int. Cl.
   *B60K 15/035*    (2006.01)
   *B60Q 9/00*      (2006.01)
   *G01F 23/00*     (2022.01)
   *G07C 5/10*      (2006.01)
   *H01M 8/04082*   (2016.01)
   *H01M 8/0432*    (2016.01)
   *H01M 8/0662*    (2016.01)
   *B60K 15/03*     (2006.01)

(52) U.S. Cl.
   CPC .............. *B01D 2253/306* (2013.01); *B01D 2257/7022* (2013.01); *B01D 2259/40084* (2013.01); *B01D 2259/4516* (2013.01); *B01D 2259/4566* (2013.01); *B60K 2015/03217* (2013.01); *B60K 2015/03322* (2013.01); *B60K 2015/03514* (2013.01); *H01M 2250/20* (2013.01)

(56) References Cited

U.S. PATENT DOCUMENTS

| | | |
|---|---|---|
| 10,333,163 B2 * | 6/2019 | Trevisan ............ H01M 8/0687 |
| 2012/0111308 A1 | 5/2012 | Schondorf et al. |
| 2016/0016462 A1 | 1/2016 | Krafzig |
| 2018/0017430 A1 | 1/2018 | Aghili et al. |

\* cited by examiner

METHOD FOR INDICATING EXCHANGE OF A FUEL VAPOR ABSORBER AND A VEHICLE WITH AN INDICATOR THEREFORE

CROSS-REFERENCE TO RELATED APPLICATION

This application is the U.S. national phase of PCT Application No. PCT/DK2021/050009 filed on Jan. 12, 2021, which claims priority to DK Patent Application No. PA 2020 00063 filed on Jan. 20, 2020, the disclosures of which are incorporated in their entirety by reference herein.

FIELD OF THE INVENTION

The invention relates to regeneration of a fuel vapor absorber in a venting pipe of a vehicle tank. In particular, it relates to method for indicating exchange of a fuel vapor absorber and a vehicle with an indicator therefore

BACKGROUND OF THE INVENTION

U.S. Pat. No. 5,749,842 discusses that overfilling of a fuel tank in a vehicle may result in fuel reaching the charcoal fuel vapor absorber in a venting pipe and damaging it, why a technical solution is found such preventing such overflow. Charcoal as fuel vapor absorber is disclosed in U.S. Pat. No. 10,107,672.

However, the efficiency of a charcoal filter is decreasing with time. Although, U.S. Pat. No. 5,749,842 also mentions regeneration of the charcoal filter, no specific procedure therefore is disclosed.

Although, fuel vapor for gasoline-driven cars is not regarded as a problem, for methanol, which is used for fuel cell driven vehicles, escaping vapor from tanks is regarded as a health problem. As the safety for humans in relation to vehicles has constant attention, there is a steady demand for improvements. It would therefore be desirable to provide an even higher degree of safety in relation to vehicles that are driven by electricity from fuel cells, especially methanol-consuming, fuel-cell-driven vehicles.

JP2003028393A discloses a procedure in which the number of pressurized gas tank fillings is counted for determining when it is time to exchange the tank, as the pressure changes can lead to deterioration of the tank. However, exchanging the entire tank does not solve the above problem in an appropriate way.

DESCRIPTION OF THE INVENTION

It is an objective to provide an improvement in the art. In particular, it is an objective to provide improved safety measures for vehicles that are driven by fuel cell systems with methanol as part of the fuel. Furthermore, it is an objective to find a simple solution for the problem of exhausted fuel vapor absorbers. These and more objectives are achieved with a system and method as described in the claims and in more detail in the following.

The objective is achieved with an indicator that indicates necessity of change of a fuel vapor absorber, which is positioned in a venting pipe of a vehicle's fuel tank.

The term "absorber" is used herein even for the case that the actual absorbing function is adsorption. For example, the absorber comprises charcoal or other active carbon material, or alternatively an absorbing polymer resin material.

In particular for vehicles that comprise a fuel cell system for providing electricity for electrical motors that are propelling the vehicle, wherein the fuel cell system is using methanol as part of the fuel, and the tank is a methanol tank, a vapor absorber is important, as there is a high demand for safety with respect to methanol.

In such case, the methanol is stored in the fuel tank and added as needed at corresponding filling stations. In order to eliminate methanol vapor around the car during the tank refilling process, the connection between the refill nozzle and the tank is tight. In some cases, the refill nozzle of the filling station may suck gases out of the tank during refilling. However, this is not always the case and even if provided with a sucking function, it is not necessarily precise enough to actually remove all gases from the tank during refilling. In such case, a venting line with an absorber is useful.

Furthermore, during driving of the vehicle or during parking of the vehicle, methanol vapor may increase the pressure in the tank, for example due to temperature increase, and a venting thereof is necessary. However, methanol vapor around the vehicle is unwanted, seeing that it implies a health risk for humans in that surrounding area.

For these reasons, some improvements are given over the prior art, as explained in the following.

In some practical embodiments, the indication is given after a predetermined number of tank fillings. During tank filling, the volume of vapor inside the tank is displaced by the liquid fuel, and the vapor is leaving the tank typically out of the vent tube of the tank. This implies that the vapor volume from the tank is expelled to the environment if not captured by the fuel vapor absorber.

In some practical embodiments, the above objective is achieved by an indication system for indicating need for exchange of a fuel vapor absorber in a tank of a vehicle, the system comprising
  a counter for counting the number of tank fillings,
  a compare function for comparing the counted number with a predetermined number,
  an indicator indicating to a user of the vehicle the need for exchanging the absorber when the counted number exceeds the predetermined number.

Typically, the compare function is provided as a program in a computer. For communication, the counter and the indicator are functionally connected to the computer.

In practice, the system counts the number of tank fillings, then compares the counted number with a predetermined number, and is then indicating to a user of the vehicle the need for exchanging the absorber when the counted number reaches or exceeds the predetermined number.

In some embodiment for the counting of tank fillings, a tank filling is defined as an addition of some unspecific amount of fuel into the tank. For example, the tank access system, potentially with a cap that needs to be removed, has a sensor that senses each time there is access to the tank through the access system. Each time such access is made, the counter increased the counted number by one.

Although, the refilling volume is not always precisely the same, the number of refillings is a good first order approximation for how much vapor has left the tank through the vent tube due to the re-fillings, for example by assuming that three quarters of the tank is refilled each time, on average.

In more advanced embodiments, a counting of a tank filling requires a minimum amount of fuel to be added. The latter can be achieved by coupling a sensor to the system, where the sensor measures the amount of fuel in the tank, in particular a level sensor. Typically, such a sensor is already part of the vehicle and may be accessed electronically and used for the counting system. Alternatively, a separate fuel level sensor is installed and used.

In some even further embodiments, a level sensor is used in the tank in order to give a more precise counting of the tank filling. For example, a minimum volume of refill as measured by the level sensor is used as criteria in order to count it as a tank filling. The level sensor is optionally an add-on sensor in the tank, or the standard fuel level meter of the vehicle is used for a signal on the basis of which the counting is done.

Optionally, the total volume of refilled fuel is counted and divided by the tank volume in order to reach a representative number of refills.

As an even further alternative, the level sensor is used for measuring the number of volume units of the total refilled fuel since the last change of the absorber. This number then serves for comparison.

The compare function is typically achieved with a correspondingly programmed routine of a computer, which is functionally connected to the various relevant components, including the counter and the indicator and the potential level sensor and potential timer. Communication between the components of the system, including the counter and the computer unit that performs the compare function, typically a computer, and the indicator, and the potential level sensor, is typically done by wires, although a wireless communication is also an option.

For users that do not drive regularly, a vehicle may be parked for longer periods. Also, in this case, fuel vapor may leak into the environment if no fuel vapor absorber is used. Although, a narrow vent pipe does not lead to a high degree of evaporation to the environment caused by exchange of vapor with surrounding air at the fuel/air interface, but fuel vapor would escape the tank due to temperature shifts where heating in day time leads to expansion of the vapor and corresponding leakage from the tank. Thus, at day time, by employing a fuel vapor absorber, fuel vapor is absorbed when the heating of the fuel vapor leads to expansion and escape from the tank to the vent tube. On the other hand, at night time when temperature falls and the gas in the tank contracts, air is entering the tank, and humidity is taken up by the methanol. New methanol vapor mixed with such air is then expelled through the vent tube at day time when the temperature increases again. In order to take into account vapor loss over extended time, in some other embodiments, the time length since the installation of a new fuel vapor absorber is taken into account in order to determine the event of indicating the necessity of a change of the fuel vapor absorber.

In some practical embodiments, the indication system comprises
- a timer that measures the time length since the last installation of a new fuel vapor absorber.
- a compare function for comparing the measured time length with a predetermined time length,
- an indicator indicating to a user of the vehicle the need for exchanging the absorber when the measured time length exceeds the predetermined time length.

In some practical embodiments, the counted number of tank fillings or volume units and the measured time are combined for a determination as to whether the absorber should be exchanged.

For example, the measured time length is divided by a pre-set period, which results in a number of periods corresponding to the measured time length. The number of determined periods is added to the number of tank fillings or volume units and the sum thereof compared to the predetermined number, which leads to activation of the indicator when the predetermined number is reached or exceeded.

By transforming different effects, like number of fillings and time since installation of the absorber, into numbers, these can be added, and the sum compared to the predetermined number.

The amount of fuel vapor that is leaving the tank depends on the heating during day time, especially, the difference in temperature as compared to night time. In particular, a high degree of vapor released from the fuel is observed at high day-time temperatures. In order to also take this into account, the temperature of the environment and/or the temperature of the methanol in the tank is taken into account in further embodiments when determining when the indicator should indicate a change of the fuel vapor absorber.

In some practical embodiments, the indication system comprises
- a timer that measures the time length since the last installation of a new fuel vapor absorber,
- a temperature measurement unit that measures the temperature variations since the last installation;
- a compare function for comparing the measured time length with a predetermined time length,
- an indicator indicating to a user of the vehicle the need for exchanging the absorber when the measured time exceeds the predetermined time length, wherein the predetermined time length is dependent on the measured temperature variations.

Advantageously, the predetermined time length is adjusted to a smaller value when the temperature variations are large and/or the temperature is high, especially when the day temperature is above a certain predetermined temperature level, for example above a level of 30° C., such as above 35° C. or 40° C.

For the embodiment with the periods that are divided into the measured time length, the pre-set period is dependent on the measured temperature variations. In particular, the period is shortened when the measured temperatures and/or the temperature variations are large.

Also in this case, the calculates number for the time that is adjusted to the temperature variation, is advantageously added to the number of refills since the installation of the absorber and the sum compared to the predetermined number.

For example, the temperature of the fuel in the tank or the temperature of the environment around the vehicle is measured and a temperature profile thereof in the measured time, which is then used to adjust the timing for the signal for exchanging the absorber. Optionally, the counted number is increased or the predetermined number decreased if the temperature profile deviates substantially from, for example is higher than, a predetermined temperature profile.

When a vehicle, for example an automobile, is equipped with such indication system, the indicator is advantageously located inside the cabin, although an outside indicator as an alternative or in addition is also possible, for example at the place where the tank is filled.

The indicator is configured for providing an alarm signal, typically an audio signal and/or a visual signal.

For example, the fuel cell in the fuel cell system is a high temperature polymer electrolyte membrane fuel cell, (HT-PEM), which operates in the range of 120° C. to 200° C., for example in the range of 160 to 170° C. HT-PEM fuel cells are advantageous in being tolerant to relatively high CO concentration and are therefore not requiring PrOx reactors between the reformer and the fuel cell stack, why simple, lightweight and inexpensive reformers can be used for fuel that is a mixture of alcohol and water, in particular methanol and water.

Optionally, the absorber has a surface area in the range from 400 m2/g to 2000 m2/g or even larger. Some useful embodiments of such absorbers include porous absorbers, for example having a surface area in the range from 400 m2/g to 2000 m2/g or even larger. An example is active carbon. However, also other material may be used, for example zeolites or adsorptive polymer resins. Some types of absorbers are based on compressed powder, whereas others have a fibrous structure. Optional absorbers include absorbents of the type that chemically react with methanol to form polymers or other chemical compounds such as larger hydrocarbons or even salts. An option is also a catalyst-based technical where the catalyst causes the methanol to react with the ambient oxygen to form water.

DESCRIPTION OF THE DRAWING

Embodiments of the invention will be described in the figures, wherein.

DETAILED DESCRIPTION OF THE INVENTION

Figure 1:
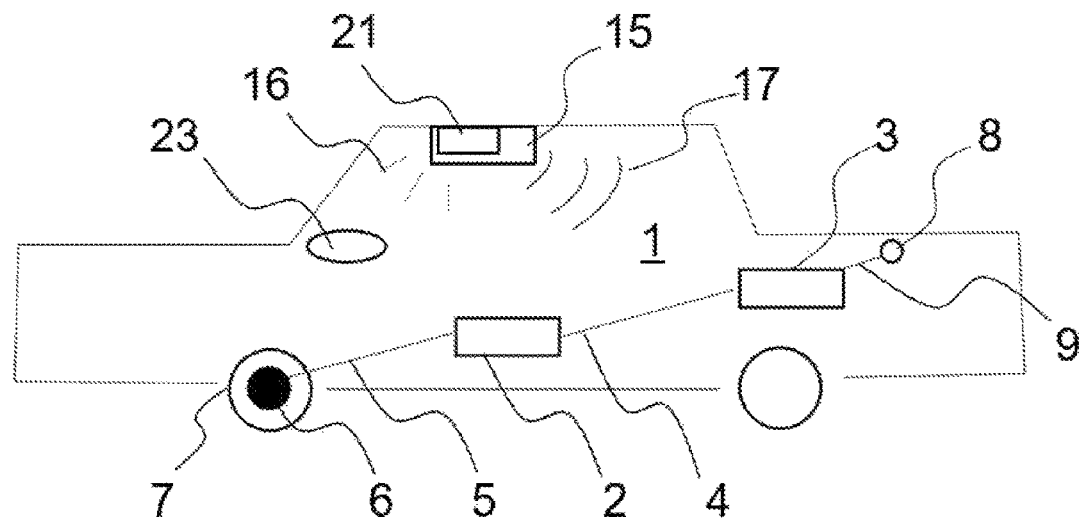
FIG. 1 a vehicle with a fuel tank
Figure 2:
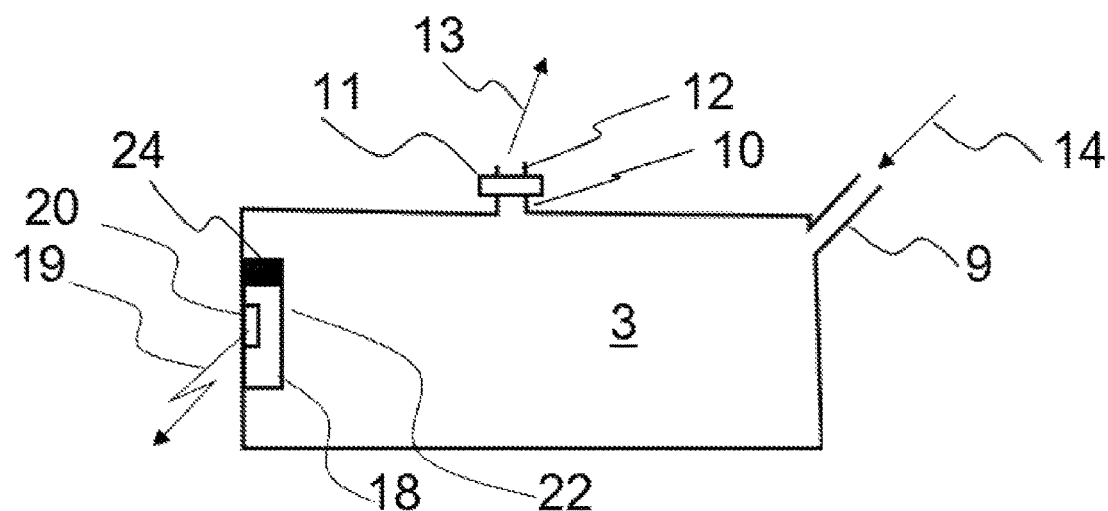
FIG. 2 is a fuel tank with a venting pipe that has an absorber.

FIG. 1 illustrates vehicle 1 with a fuel cell 2 and a liquid fuel tank 3, and FIG. 2 illustrates the fuel tank 3 in greater detail.

The fuel cell 2 of the vehicle 1, which is exemplified as an automobile, provides electricity which is fed through a corresponding electrical cable 5 to an electrical engine 6 that is driving the corresponding wheel 7 or wheels for propelling the vehicle 1.

The fuel of the fuel cell 2 is potentially a mix of water and methanol, the methanol being provided from a fuel tank 3 through a pipe 4 to the fuel cell 2. A refill pipe 9 connects the tank 3 with a tank access system 8 for receiving fuel for refill of the tank 3 through the refill pipe 9, which is indicated by arrow 14. The refilling pipe 9 is typically covered with a closure member.

In order to release gases, such as fuel vapor, from the tank 3, a venting pipe 10 with a venting exit 12 is provided at or near the top of the tank 3. For absorbing the fuel vapor before these may leave the tank 3, an absorber 11 is provided upstream of the venting exit 12, which absorbs the fuel vapor, for example by adsorption, depending on the type of absorber 11.

When the absorber 11 is exhausted, the absorption is not any longer working satisfactory, and fuel vapor may escape from the tank 3 through the venting exit 12, which is indicated by arrow 13. In order to prevent uncontrolled exhaustion of the absorber 11 and to ensure that fuel vapor is actually absorbed, the vehicle comprises an indicator unit 15 which gives an alarm signal, for example based on light 16 or sound 17 or both when it is time to renew or regenerate the absorber 11.

In order to indicate such necessity for exchange of the absorber 11, the number of refillings of the tank 3 are counted by a counter 21, for example as part of the indicator unit 15. A computer, for example as part of the counter 21 may comprise a programmed computer routine that is comparing the count with a predetermined number of counts. When the number of actual refilling counts exceeds the predetermined number, an alarm 16, 17 indicates that it is time to change the absorber 11.

Optionally, the system, for example the counter 21 or computer, also comprises a timer that measures the time since the installation of the absorber and takes this into account for determining the correct timing for signaling need of exchange of the absorber.

For example, a signal for a refill of the tank 3 is provided to the indicator unit 15 by the vehicle's internal fuel level meter 23. This would imply the option that the counter 21 can use a computer check routine on the basis of the level signal from the vehicle's internal fuel level meter 23 for determining whether at least a minimum amount of fuel was added to the tank 3 before the amount is actually qualified to count as a refill for the purpose.

Alternatively, a separate tank fuel level sensor 22 is installed in the tank 3 and used. In this case the separate tank fuel level sensor 22 and the indicator unit 15 communicate, for example wirelessly 19 with corresponding transceivers 20.

The separate tank level sensor 22 is an option. As a further alternative, there is provided a counter module 18 inside the tank 3 for counting the refills. As an option, the computer 24 is functionally connected to such counter module 18, and as an option, the level meter 22 is part of such counter module 18. In order to initiate an alarm, the computer 24 sends a signal to the indicator 15, for example a wireless signal 19.

As it appears from the foregoing, there are several options for practical embodiments for the counting, in which the options can be combined in various ways:

refill counting with or without level sensor 22;
using the vehicle's internal fuel level meter 23 for the signal that is used as basis for the counting or using a level sensor 22 separately installed in the tank 3;
using a minimum volume of refill in order to count it as a refill;
counting the total volume of refilled fuel and dividing the number by a suitable tank volume to reach a number of full refills;
a computer 24 as part of the indicator unit 15 or provided separate, for example as part of a counter module 18 inside the tank;
wired or wireless communication between the components of the counter and alarm system.

As an even further alternative, a counter or signal transmitter for counting could also be implemented in the tank access system 8, for example in closure member or in the mechanical cooperating receiver for the closure member, so that each time the closure member is removed and a refill nozzle is attached to the tank access system, a signal is given which represents a count.

REFERENCE NUMBERS 1 vehicle
2 fuel cell
3 tank
4 fuel pipe
5 electric wire
6 electric motor
7 wheel
8 tank access system
9 fuel refill pipe
10 venting pipe
11 absorber
12 exit of venting pipe
13 escaping fuel vapor 14 fuel for refill
15 indicator unit
16 visual signal, for example flash
17 audio signal
18 counter module
19 wireless signal
20 transceiver
21 counter
22 level sensor
23 internal fuel level meter
24 computer

The invention claimed is:

1. A vehicle comprising a fuel tank, the vehicle further comprising an indication system configured for indicating necessity for exchange of a component of the vehicle; the system comprising
a counter for counting the number of tank fillings or the number of volume units of refilled fuel since the installation of the component,
a compare function for comparing the counted number with a predetermined number,
an indicator unit indicating to a user of the vehicle the need for exchanging the component when the counted number exceeds the predetermined number;
characterized in that the component is a fuel vapor absorber, wherein the fuel tank comprises a vent pipe and the fuel vapor absorber is provided in the vent pipe for absorbing fuel vapor.

2. The vehicle according to claim 1, wherein the system further comprises a timer that measures the time length since the last installation of a new fuel vapor absorber and a compare function programmed for comparing the measured time length with a pre-determined time length, wherein the indicator unit is configured for indicating to the user of the vehicle the need for exchanging the absorber when the measured time length exceeds the predetermined time length, wherein the counted number and the measured time length are combined for a determination as to whether the absorber should be exchanged.

3. The vehicle according to claim 1, wherein the vehicle comprises a cabin, and wherein the indicator unit is located inside the cabin and configured for providing an alarm signal, the alarm signal comprising at least one of an audio signal and a visual signal.

4. The vehicle according to claim 1, wherein the tank comprises a level sensor for the fuel level in the tank, and the counter is configured to only increase the counted number for refills, if an actual refill comprises a minimum volume added to the tank as measured by the level sensor.

5. The vehicle according to claim 1, wherein the vehicle comprises methanol fuel in the fuel tank and a fuel cell system connected to the tank and configured for using the methanol fuel for providing electricity for electrical motors propelling the vehicle.

6. The vehicle according to claim 1, wherein the fuel vapor absorber is porous with an active surface area of more than 400 m2/g to 2000 m2/g selected among active carbon, zeolites or adsorptive polymer resins.

7. A method of indicating need for exchange of a component of a vehicle, the method comprising counting by a counter the number of tank fillings or the number of volume units of refilled fuel since the installation of the component, comparing the counted number with a predetermined number, and indicating to a user of the vehicle by an indicator unit the need for exchanging the component when the counted number exceeds the predetermined number, characterized in that the component is a fuel vapor absorber.

8. The method according to claim 7, the method comprising measuring, with a timer, the time length since the installation of the fuel vapor absorber and comparing the measured time length with a predetermined time length, and by the indicator unit indicating to the user of the vehicle the need for exchanging the absorber when the measured time length exceeds the predetermined time length, wherein the counted number and the measured time length are combined for a determination as to whether the absorber should be exchanged.

9. The method according to claim 8, where the method comprises increasing the counted number or decreasing the predetermined number with increased measured time.

10. The method according to claim 9, the method comprising dividing the measured time by a predetermined period and adding the number of calculated periods corresponding to the measured time length to the counted number.

11. The method according to claim 7, the method comprising measuring the temperature of the fuel in the tank or the temperature of the environment around the vehicle and providing a temperature profile thereof in the measured time, and increasing the counted number or reducing the predetermined number if the temperature profile is higher than a predetermined temperature profile.

12. The method according to claim 7, wherein the vehicle comprises a cabin and wherein the indicator unit is located inside the cabin and the method comprises providing an alarm signal inside the cabin by at least one of an audit signal and a visual signal.

13. The method according to claim 7, wherein the tank comprises a level sensor for fuel level in the tank, and the method comprises only increasing the counted number for tank fillings by the counter if an actual refill comprises a minimum volume added to the tank as measured by the level sensor.

14. The method according to claim 7, wherein the vehicle comprises a fuel cell system for providing electricity for electrical motors propel ling the vehicle, wherein the method comprises using methanol as part of the fuel for the fuel cell system and the tank is a methanol tank.

* * * * *